United States Patent
Hwang et al.

(10) Patent No.: US 11,011,934 B2
(45) Date of Patent: May 18, 2021

(54) WIRELESS POWER TRANSMITTER CAPABLE OF AUTOMATIC ADJUSTMENT ACCORDING TO IMPEDANCE CHANGE

(71) Applicant: MAPS, INC., Seoul (KR)

(72) Inventors: Jong Tae Hwang, Seoul (KR); Ik Soo Jeon, Yongin-si (KR); Dong Su Lee, Dongducheon-si (KR); Hyun Ick Shin, Seoul (KR); Joon Rhee, Seoul (KR)

(73) Assignee: MAPS, INC., Seoul (KR)

( * ) Notice: Subject to any disclaimer, the term of this patent is extended or adjusted under 35 U.S.C. 154(b) by 374 days.

(21) Appl. No.: 16/305,074

(22) PCT Filed: Jun. 12, 2017

(86) PCT No.: PCT/KR2017/006073
§ 371 (c)(1),
(2) Date: Nov. 28, 2018

(87) PCT Pub. No.: WO2017/217716
PCT Pub. Date: Dec. 21, 2017

(65) Prior Publication Data
US 2020/0274397 A1     Aug. 27, 2020

(30) Foreign Application Priority Data

Jun. 13, 2016  (KR) .................. 10-2016-0073341
Dec. 2, 2016  (KR) .................. 10-2016-0163730

(51) Int. Cl.
*H02J 50/12*     (2016.01)
*H02J 50/80*     (2016.01)
(Continued)

(52) U.S. Cl.
CPC .............. *H02J 50/12* (2016.02); *H02J 50/70* (2016.02); *H02J 50/80* (2016.02); *H04B 5/0031* (2013.01)

(58) Field of Classification Search
CPC . H02J 50/12; H02J 50/70; H02J 50/80; H04B 5/0031; H04B 5/0037; H04B 5/0043
(Continued)

(56) References Cited

U.S. PATENT DOCUMENTS 8,736,368 B2   5/2014   Irish et al.
9,281,711 B2   3/2016   Irish et al.
(Continued)

FOREIGN PATENT DOCUMENTS

JP    2014-519798 A    8/2014
KR    10-2013-0087976 A    8/2013
(Continued)

OTHER PUBLICATIONS

International Search Report dated Sep. 19, 2017 in corresponding International Patent Application No. PCT/KR2017/006073 (2 pages in English and 2 pages in Korean).
(Continued)

*Primary Examiner* — Nathaniel R Pelton
(74) *Attorney, Agent, or Firm* — NSIP Law

(57) ABSTRACT

Provided is a wireless power transmitting unit capable of auto-tuning according to impedance change. The wireless power transmitting unit according to an embodiment can stabilize the operation of the amplifier by changing the resonance frequency of the resonator without measuring the phase information about the resonator.

13 Claims, 13 Drawing Sheets

(51) Int. Cl.
*H02J 50/70* (2016.01)
*H04B 5/00* (2006.01)

(58) Field of Classification Search
USPC .......................................................... 320/108
See application file for complete search history.

(56) References Cited

U.S. PATENT DOCUMENTS

| | | | |
|---|---|---|---|
| 9,384,885 B2 | 7/2016 | Karalis et al. | |
| 9,787,141 B2 | 10/2017 | Karalis et al. | |
| 2011/0090723 A1* | 4/2011 | Hu | H02J 7/025 |
| | | | 363/74 |
| 2012/0306284 A1 | 12/2012 | Lee et al. | |
| 2013/0033118 A1 | 2/2013 | Karalis et al. | |
| 2013/0043951 A1 | 2/2013 | Irish et al. | |
| 2014/0252873 A1 | 9/2014 | Irish et al. | |
| 2016/0352152 A1 | 12/2016 | Karalis et al. | |
| 2017/0033586 A1* | 2/2017 | Weidner | H02M 3/337 |
| 2017/0149285 A1* | 5/2017 | Ushijima | H02J 50/12 |
| 2017/0229921 A1 | 8/2017 | Hwang et al. | |
| 2018/0048188 A1 | 2/2018 | Karalis et al. | |

FOREIGN PATENT DOCUMENTS

| | | |
|---|---|---|
| KR | 10-2014-0053282 A | 5/2014 |
| KR | 10-2014-0053302 A | 5/2014 |
| KR | 10-2016-0017560 A | 2/2016 |
| WO | WO 2016/033073 A1 | 3/2016 |

OTHER PUBLICATIONS

Korean Office Action dated Oct. 18, 2017 in corresponding Korean Patent Application No. 10-2016-0163730 (4 pages in Korean).
Korean Notice of Allowance dated Feb. 28, 2018 in corresponding Korean Patent Application No. 10-2016-0163730 (3 pages in Korean).

* cited by examiner

Class-3 impedance contour

WIRELESS POWER TRANSMITTER CAPABLE OF AUTOMATIC ADJUSTMENT ACCORDING TO IMPEDANCE CHANGE

TECHNICAL FIELD

The present invention relates to wireless power transmission and reception techniques.

BACKGROUND ART

In Alliance for Wireless Power (A4WP), which is a wireless charging standard using a frequency of 6.78 MHz, the impedance of a load is reflected in a wireless power transmitting unit (PTU), and therefore the operation point and output power of an amplifier constituting the PTU are determined by the impedance of the load. Accordingly, an auto-tuning circuit for tuning a resonator according to the impedance of the reflected load to ensure a stable operation point and smoothly transmit the output power is required.

There is a technique for detecting a voltage/current of the resonator to determine the phase and operate the resonator such that the resonator has a similar resonance point according to change in impedance of the load. However, with the technique of A4WP, it is not easy to realize a circuit capable of accurately detecting the phase because the resonance frequency of the resonator is as high as 6.78 MHz and the voltage of the resonator can reach several hundreds of volts.

DISCLOSURE

Technical Problem

The present invention is directed to providing a wireless power transmitting unit capable of stable operation through auto-tuning according to impedance change of a load without measuring the phase information about the resonator.

Technical Solution

One aspect of the present invention provides an auto-tuning device for a wireless power transmitting unit, including: a hard-switching detector configured to detect a hard-switching operation state of a switch in an amplifier constituting a wireless power transmitting unit; and a controller configured to automatically adjust a value of a resonant capacitor according to the detected hard-switching operation state.

The hard-switching detector may detect whether the switch is turned on based on a drive voltage signal of the switch, and detect whether the switch is in the hard-switching operation state based on a drain voltage of the switch when the switch is turned on.

When the switch is in an operation state in which the resonance frequency is increased by a load and thus hard switching is performed, the controller may increase the value of the resonant capacitor to reduce an increment of the resonance frequency. When the switch is in an operation state in which the resonance frequency is decreased by the load and thus hard switching is performed, the controller may decrease the value of the resonant capacitor to increase a decrement of the resonance frequency.

The controller may determine a current operation state of the amplifier using an output power value of the amplifier and a received power value of a wireless power receiving unit in addition to the hard-switching operation state, and controls the value of the resonant capacitor according to a result of the determination. The controller may control the value of the resonant capacitor and an output power of the amplifier.

The resonant capacitor may be a variable capacitor whose capacitance is electrically adjusted. The auto-tuning device may further include a digital-to-analog converter (DAC) configured to generate a variable signal under control of the controller and apply the variable signal to the variable capacitor. The resonant capacitor may include a plurality of capacitors connected to capacitor switches, capacitances of the plurality of capacitors being variable by switching of the respective switches. The auto-tuning device may further include a plurality of capacitor switches to be selectively switched according to a switch control signal received from the controller.

Another aspect of the present invention provides an auto-tuning device for a wireless power transmitting unit, including: a hard-switching detector configured to detect a hard-switching operation state of a switch in an amplifier constituting a wireless power transmitting unit; a first determination unit configured to receive a detection signal from the hard-switching detector and determine whether the switch is in the hard-switching operation state; a transmitted power processing unit configured to acquire a value of a source voltage and a value of a source current of the amplifier and calculate a value of a transmitted power of the wireless power transmitting unit; a received power processing unit configured to acquire a value of a received power from a wireless power receiving unit; a second determination unit configured to determine a current operation state of the amplifier using the calculated value of the transmitted power and the acquired value of the received power; and an adjustment unit configured to adjust a value of a resonant capacitor and an output power of the amplifier according to a result of the determination of the first determination unit and the second determination unit.

When the switch is in the hard-switching operation state according to the result of the determination of the first determination unit, and the value of the transmitted power of the wireless power transmitting unit exceeds a maximum allowable received power set to drive a load of the wireless power receiving unit and thus the wireless power transmitting unit is in an excessive power transmission state according to the result of the determination of the second determination unit, the adjustment unit may increase the value of the resonant capacitor, and reduce, when the increased value of the resonant capacitor reaches a maximum value, the source voltage of the amplifier to lower the transmitted power of the wireless power transmitting unit.

When the switch is in the hard-switching operation state according to the result of the determination of the first determination unit, and the wireless power transmitting unit is not in an excessive power transmission state according to the result of the determination of the second determination unit, the adjustment unit may reduce the value of the resonant capacitor.

When the switch is not in the hard-switching operation state according to the result of the determination of the first determination unit, and the received power of the wireless power receiving unit is not lower than a minimum received power set to drive a load according to the result of the determination of the second determination unit, the adjustment unit may determine whether the received power of the wireless power receiving unit is excessively higher than necessary, and when the received power is excessively high, the adjustment unit may reduce the source voltage of the amplifier without changing the value of the resonant capacitor to lower the transmitted power of the wireless power transmitting unit.

When the switch is not in the hard-switching operation state according to the result of the determination of the first determination unit, and the received power of the wireless power receiving unit is lower than a minimum received power set to drive a load according to the result of the determination of the second determination unit, the adjustment unit may reduce the value of the resonant capacitor and, when the transmitted power of the wireless power transmitting unit is still low although the reduced value of the resonant capacitor has reached the minimum value, the adjustment unit may increase the source voltage of the amplifier to increase the transmitted power of the wireless power transmitting unit.

The received power processing unit may receive the value of the received power of the wireless power receiving unit from the wireless power receiving unit through Bluetooth communication.

Advantageous Effects

According to an embodiment of the present invention, since auto-tuning is attempted by detecting an operation state of a switch, particularly a hard switching state, not only the switch can be protected quickly but the need for a complicated and precise impedance detection circuit is eliminated. Therefore, auto-tuning can be performed in a very simple manner Further, an amplifier is allowed to smoothly transmit output power at a stable operation point by tuning the resonator without measuring the phase information about the resonator.

MODES OF THE INVENTION

Figure 1:
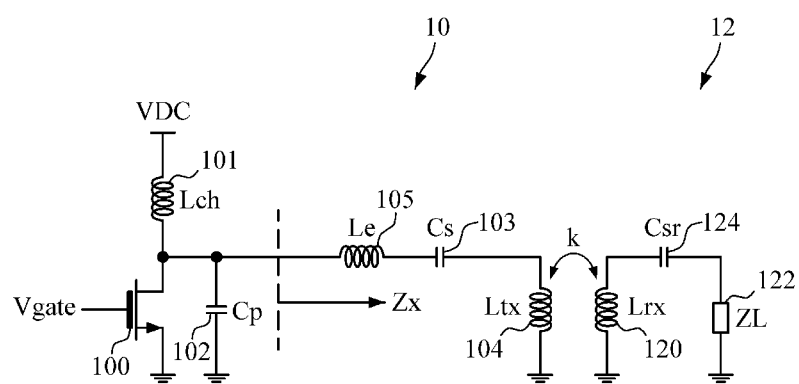
FIG. 1 is a configuration diagram of a wireless power transmission/reception system using an amplifier according to one embodiment of the present invention.

Advantages and features of the present invention and methods to achieve the same will become apparent from the detailed descriptions of exemplary embodiments herein below with reference to the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art. The present invention is only defined by the claims. Like reference numerals designate like elements throughout the specification.

In the following description of exemplary embodiments of the present invention, a detailed description of known functions and configurations incorporated herein will be omitted when it may make the subject matter of the present invention rather unclear. The terms described below are defined in consideration of functions in exemplary embodiments of the present invention, which may vary depending on the intention of a user or an operator, customs, or the like. Therefore, the definitions of the terms should be based on the contents throughout this specification. Hereinafter, exemplary embodiments of the present invention will be described in detail with reference to the accompanying drawings.

FIG. 1 is a configuration diagram of a wireless power transmission/reception system using an amplifier according to one embodiment of the present invention.

Referring to FIG. 1, the wireless power transmission/reception system includes a power transmission unit (PTU) 10 and a power receiving unit (PRU) 12.

The PTU 10 includes an amplifier and a resonator. The amplifier may be a class-E amplifier. The amplifier includes a choke inductor Lch 101, a switch 100, and a capacitor Cp 102 connected in parallel with the switch 100. The current of the choke inductor Lch induced by the switching operation of the switch 100 is supplied to a transmission antenna Ltx 104 to supply a wireless power signal to the PRU 12. The switch 100 may be a metal-oxide-semiconductor field-effect transistor (MOSFET). However, even when the switch 100 is replaced with an active element capable of switching operation, for example, a bipolar junction transistor (BJT), a SiC FET, or a GaN FET, the same function may be performed.

The resonator may include a resonant capacitor Cs 103 and the transmission antenna Ltx 104. The resonator may further include an inductor Le 105. The resonant capacitor Cs 103 constitutes a resonator together with the transmission antenna Ltx 104 to determine a resonance frequency. It is common that the resonance frequency is set to coincide with a driving frequency of the switch 100. The inductor Le 105 serves to delay current to cause the switch 100 to perform zero-voltage switching (ZVS). By removing the inductor Le 105 and increasing the capacitance of the resonant capacitor Cs 103, the same phase delay of current as caused by the inductor Le 105 may be caused. However, in FIG. 1, the inductor Le 105 is not removed in order to provide a description in accordance with the configuration of a general amplifier. The capacitor Cp 102 connected in parallel to the switch 100 should also be set to a suitable value to allow the switch 100 to perform the ZVS operation.

The PRU 12 may be represented by a simple equivalent unit including a reception antenna Lrx 120, a capacitor Csr 124 for resonance, and a load impedance ZL 122. Optimum power transmission may be implemented when the resonance frequency generated by the reception antenna Lrx 120 and the capacitor Csr 124 is equal to the resonance frequency generated by the transmission antenna Ltx 104 and the resonant capacitor Cs 103. Therefore, when the driving frequency of the switch 100 is fr, it is better to satisfy Equation 1 below.

$$fr = \frac{1}{2\pi\sqrt{Ltx \cdot Cs}} = \frac{1}{2\pi\sqrt{Lrx \cdot Csr}} \qquad \text{Equation 1}$$

In FIG. 1, k is a coupling coefficient indicating the degree of coupling between the two antennas Ltx 104 and Lrx 120, and has a value between 0 and 1. When Equation 1 is satisfied, the load impedance ZL 122 of the PRU 12 is reflected in the PTU 10, which may be equivalently represented as shown in FIG. 2.

Figure 2:
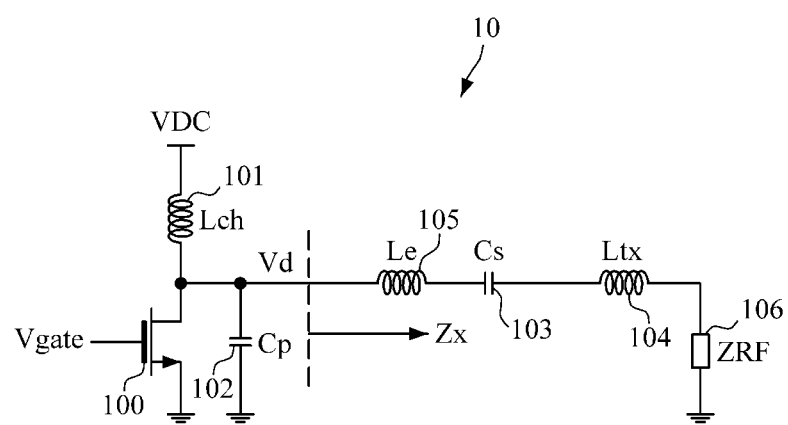
FIG. 2 is a circuit diagram of a power transmitting unit (PTU) including a reflected load impedance ZRF transferred from a power receiving unit (PRU) to the PTU according to one embodiment of the present invention.

FIG. 2 is a circuit diagram of a PTU including a reflected load impedance ZRF transferred from the PRU to the PTU according to one embodiment of the present invention.

Referring to FIGS. 1 and 2, the impedance of the PRU 12 reflected in the PTU 10 is denoted by the impedance ZRF 106. The impedance ZRF 106 satisfies Equation 2 below.

$$ZRF = \frac{(2\pi fr)^2 \cdot k^2 \cdot Ltx \cdot Lrx}{ZL} \qquad \text{Equation 2}$$

In Equation 2, the impedance ZRF 106 is proportional to the inverse of ZL 122 and proportional to k. The impedance ZL 122 may be an inductive or capacitive load, while the impedance ZRF 106 may be considered as a resistor when the impedance ZL 122 is a complete resistor. Therefore, the impedance ZRF 106 of the PTU 10 may be an inductive or capacitive load, and thus the load impedance ZRF 106 of the PTU 10 may be considered as an impedance component combining a resistance R, which is a real part, and a reactance X, which is an imaginary part, as in Equation 3 below.

$$ZRF = R + jX \qquad \text{Equation 3}$$

Figure 3:
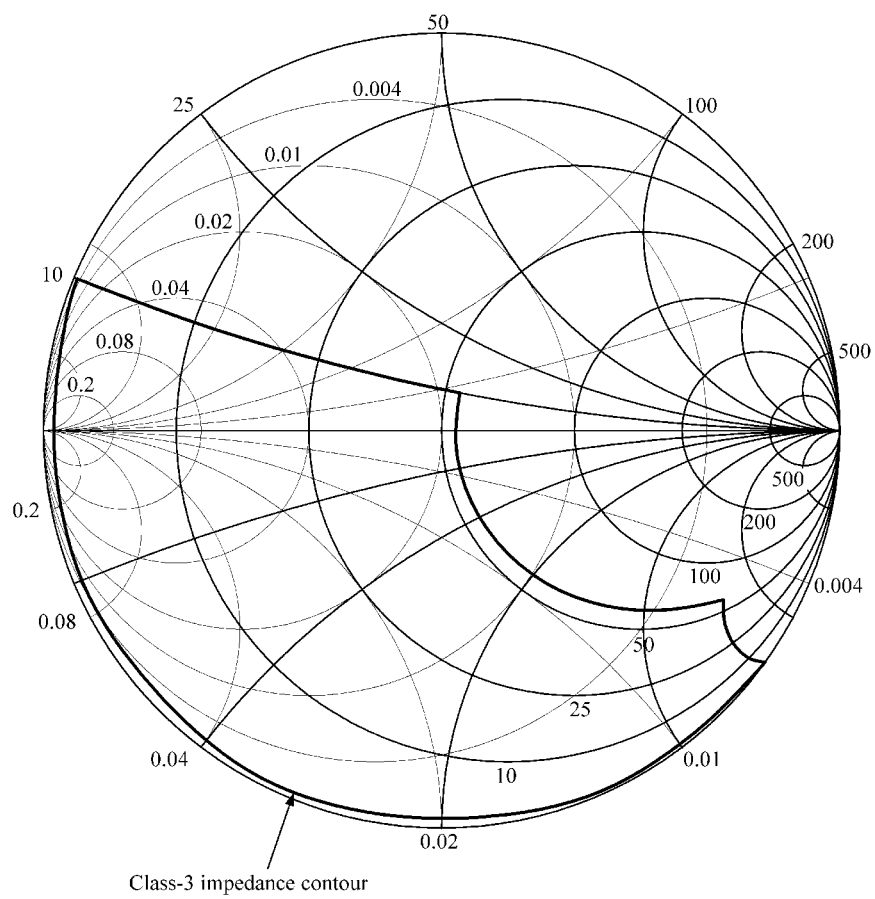
FIG. 3 is a Smith chart showing a load impedance of an A4WP Class-3 PTU according to one embodiment of the present invention.

FIG. 3 is a Smith chart showing a load impedance of an A4WP Class-3 PTU according to one embodiment of the present invention.

In Alliance for Wireless Power (A4WP), which is a wireless charging standard using a frequency of 6.78 MHz, the output powers of the PTU are divided into classes, and there is an impedance standard for each class. In the case of Class-3 outputting 16 W, the impedance to be satisfied can be presented on the Smith chart as shown in FIG. 3.

Referring to FIG. 3, the resistance R ranges up to 55 [Ohm], and smooth operation should be ensured in the range of the reactance X between −150 to 10. The smooth operation refers to a stable operation state in which the amplifier of the PTU can supply power required by the PRU and a class-E amplifier is not overloaded. In such a wide range of the impedance ZRF, the operation point of the amplifier changes and thus three operations are possible. The operation state of the amplifier can be seen from a drain voltage Vd of a switching device as shown in FIG. 4.

Figure 4:
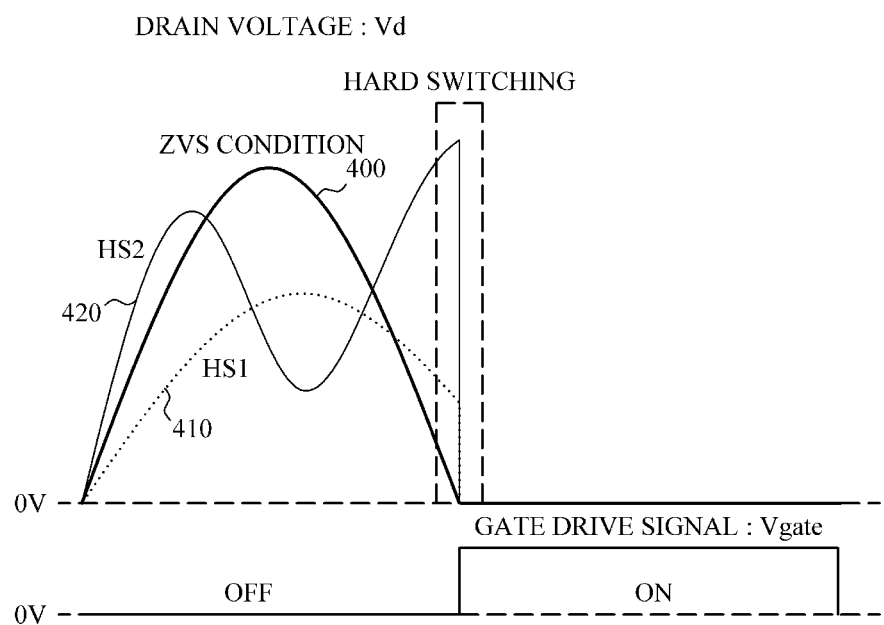
FIG. 4 is a waveform diagram of a drain voltage of a switch performing an operation of ZVS and a hard-switching operation of an amplifier according to one embodiment of the present invention.

FIG. 4 is a waveform diagram of a drain voltage of a switch performing an operation of ZVS and a hard-switching operation of an amplifier according to one embodiment of the present invention.

Referring to FIGS. 2 and 4, when the switch 100 is on, the drain voltage Vd of the switch 100 is close to 0 V. However, when the switch 100 is turned off, the drain voltage Vd of the switch 100 repeatedly rises and falls due to the current of the resonator and the current of the choke inductor Lch 101 as shown in FIG. 4. In general, when the impedance of the impedance ZRF 106 is in a region considered in the design of the class-E amplifier, the ZVS condition 400 in FIG. 4 is satisfied and the drain waveform becomes similar to a half-sine wave, and the voltage of the drain waveform becomes 0 V immediately before the switch 100 is turned on. Therefore, this operation is called zero-voltage switching (ZVS). In the case where the ZVS condition 400 is satisfied, the voltage of the capacitor Cp 102 becomes zero when the switch 100 is turned on. Accordingly, a current spike, which is generated in discharging of the capacitor Cp 102, does not occur and an additional loss is not produced. Therefore, the most ideal operation state is obtained.

However, the current of the resonator may be small depending on the state of the impedance ZRF 106. In this case, the charging and discharging of the capacitor Cp 102 is not smooth and a waveform such as a hard-switching type-I (hereinafter referred to as HS1) 410 shown in FIG. 4 may be produced. Under the HS1 condition 410, the peak of the drain voltage Vd is low. However, because the drain voltage Vd is not zero when the switch 100 is turned, a current spike occurs and heat is generated due to an over-current during discharging of the capacitor Cp 102. This event usually occurs when the X-component of the impedance ZRF 106 has a positive (+) value, and thus lowers the resonance frequency together with the capacitor Cs 103 and the transmission antenna Ltx 104.

When the X-component of the impedance ZRF 106 has a negative (−) value whose magnitude is large, it may increase the resonance frequency together with the capacitor Cs 103 and the transmission antenna Ltx 104, and the resonance frequency may be greater than or equal to fr. In this case, as shown in FIG. 4, the operation of hard-switching type-II (hereinafter referred to as HS2) 420 is performed in which hard switching occurs while two peaks are produced. Both HS1 410 and HS2 420 are conditions that should be avoided. However, since HS2 420 can cause a higher drain voltage at the start of switching, HS2 420 may be considered a weaker operation state. When the operation of HS1 410 or HS2 420 is performed, heat generated in the switch 100 may rapidly increase and thus the switch 100 may be destroyed.

Figure 5:
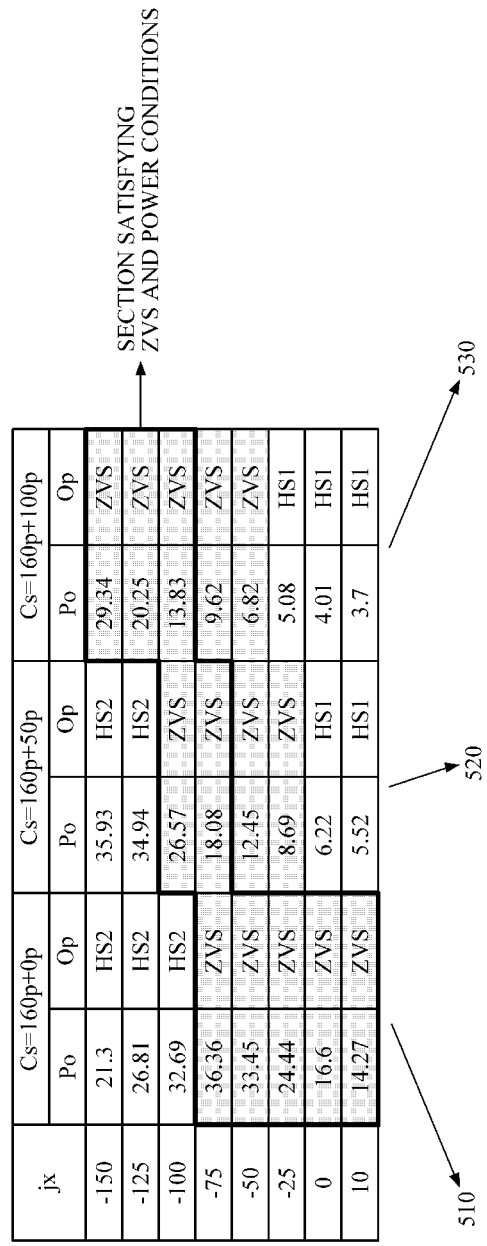
FIG. 5 is a table showing a change in operation point of an amplifier by a series resonant capacitor Cs and ZRF according to one embodiment of the present invention.
Figure 6:
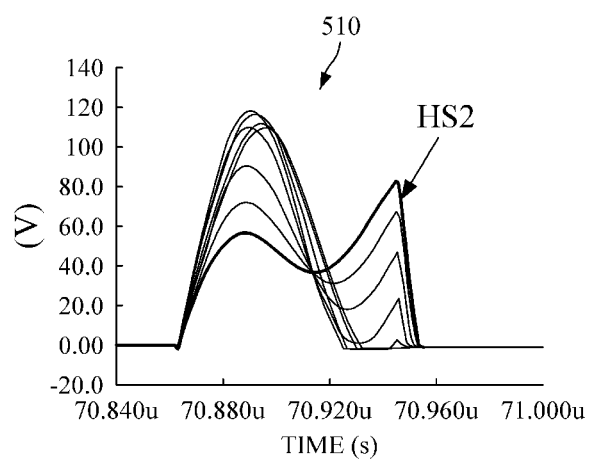
FIGS. 6 to 8 are graphs depicting changes in voltage over time according to the table of FIG. 5.
Figure 7:
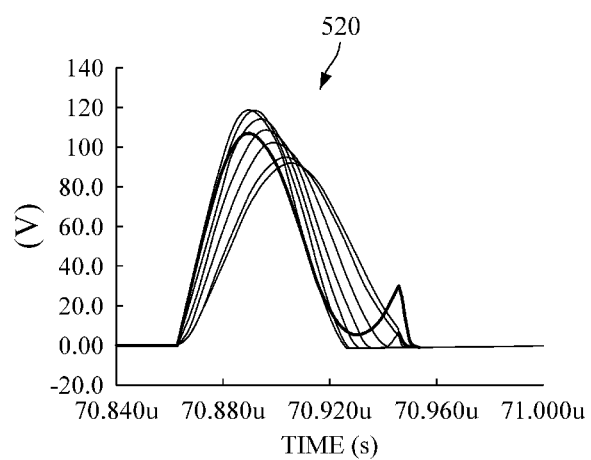
Figure 8:
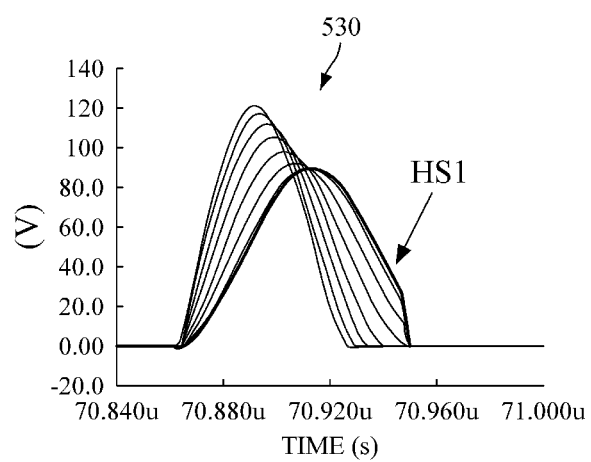

FIG. 5 is a table showing a change in operation point of an amplifier by a series resonant capacitor Cs and ZRF according to one embodiment of the present invention, and FIGS. 6 to 8 are graphs depicting changes in voltage over time according to the table of FIG. 5.

FIG. 5 shows a result of simulating the PTU by changing the value of the resistance R from 1 to 55 and the value of the inductance X from −150 to 10. In the table of FIG. 5, Po denotes an effective output power, and the unit thereof is [W]. Op denotes an operation state, and is classified into three states of ZVS, HS1 and HS2. When Cs=160 pF, the operation of HS2 510 occurs when the value of the X component becomes less than or equal to −75. Here, when Cs is slightly increased to set Cs=160 pF+50 pF, X, which is the condition for the operation of HS2 510, is reduced, and thus the operation of HS2 510 occurs when X is less than or equal to −125. When Cs is increased to 160 pF+100 pF, the operation of ZVS 520 may be performed even if X is −150. However, when X has a positive (+) or negative (−) value whose magnitude is small, the operation of HS1 530 may be performed. In this simulation, R is 55Ω (ohms). In this condition, the output power of 16 W should be obtained. The condition for VDC was 30 V. The output power can be increased by increasing VDC. Therefore, the output power was considered to be satisfied on the assumption that VDC can be slightly increased when the power is greater than or equal to 13 W. In the table of FIG. 5, the portion defined by the thick line represent states satisfying the ZVS condition and the output power condition. It can be seen that the tuning point of the resonator needs to be changed in order to satisfy the output power condition even if ZVS is performed.

Regarding the operation states, it can be seen from the simulation that, when the operation of HS2 510 is performed, the value of the capacitor Cs needs to be increased to decrease the increased resonance frequency produced by −X. It can also be seen that, when the operation of HS1 530 is performed, the value of the capacitor Cs needs to be decreased to increase the resonance frequency to a certain extent because the output power is not smoothly obtained in usual cases.

Figure 9:
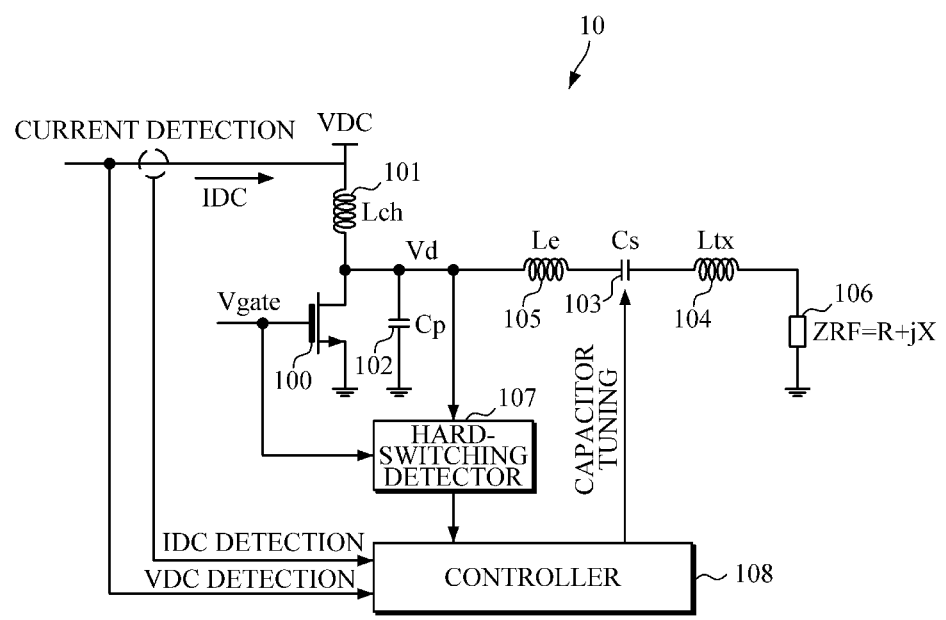
FIG. 9 is a configuration diagram of an auto-tuning circuit of a PTU according one embodiment of the present invention.

FIG. 9 is a configuration diagram of an auto-tuning circuit of a PTU according one embodiment of the present invention.

Referring to FIG. 9, a controller 108 controls the resonance frequency of the resonator. To this end, the resonant capacitor Cs is automatically tuned. According to the auto-tuning of the resonant capacitor Cs, the amplifier configured to transmit output power to the resonator may smoothly transmit the output power at a stable operation point. In FIG. 9, VDC denotes a direct current (DC) source voltage applied to the amplifier, and IDC denotes the amount of current supplied from a DC power source. Accordingly, VDC×IDC is power consumption of the amplifier. The power consumption is proportional to the output power of the amplifier.

Generally, the DC source voltage VDC is increased as a method to increase the output power of the amplifier. A hard-switching detector 107 detects the drain voltage Vd of the switch 100 to detect whether hard switching occurs when a gate drive signal Vgate becomes high and the switch is turned on. Then, a logic level signal indicating whether the hard switching is detected is output. Therefore, the gate drive signal Vgate and the switch drain signal Vd are required for detection of the hard switching. The hard-switching detector 107 may be configured by a combination of a comparator and various circuits. However, since there are various implementation methods for the hard-switching detector, circuits are not particularly limited in the present invention.

The controller 108 determines the operation state of a current switch based on a signal received from the hard-switching detector 107. Then, a signal for adjusting the value of the resonant capacitor Cs is generated according to a result of the determination to perform auto-tuning of the resonator. For example, when the operation state of the switch is the state of HS2 in which the resonance frequency is increased due to the load and hard switching is performed, the value of the resonant capacitor Cs is increased to reduce an increment of the resonance frequency. On the other hand, when the operation state of the switch is the state of HS1 in which the resonance frequency is decreased due to the load and hard switching is performed, the value of the resonant capacitor Cs is decreased to increase a decrement of the resonance frequency.

In one embodiment, the controller 108 determines the current operation state of the amplifier using the value of output power of the amplifier and the value of received power of the PRU in addition to the hard-switching operation state. The controller may calculate the output power of the current amplifier using the DC source voltage VDC and the DC source current IDC. The PTU may be automatically tuned by controlling the value of the resonant capacitor CS and the DC source voltage VDC applied to the amplifier according to the result of determination of the current operation state of the amplifier. An example of PTU auto-tuning of the controller 108 will be described below with reference to FIG. 10. The value of the received power of the PRU may be transmitted to the PTU through Bluetooth communication. The controller 108 includes a micro-controller.

Figure 10:
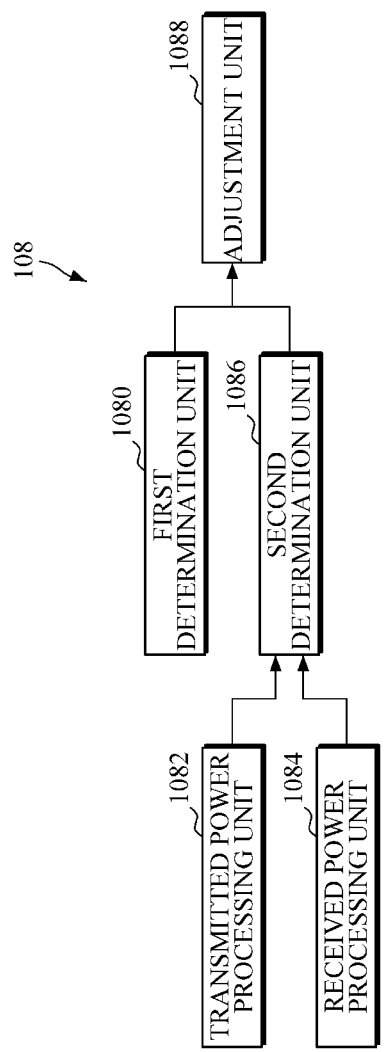
FIG. 10 is a detailed configuration diagram of the controller of FIG. 9 according to one embodiment of the present invention.

FIG. 10 is a detailed configuration diagram of the controller of FIG. 9 according to one embodiment of the present invention.

Referring to FIGS. 9 and 10, the controller 108 includes a first determination unit 1080, a transmitted power processing unit 1082, a received power processing unit 1084, a second determination unit 1086, and an adjustment unit 1088.

The first determination unit 1080 receives a detection signal from the hard-switching detector 107 and determines whether the switch is in the hard-switching operation state. The received detection signal is in the form of a logic level, which indicates whether the switch is in the hard-switching operation state. The transmitted power processing unit 1082 acquires the values of the DC source voltage VDC and the DC source current IDC of the amplifier and calculates the value of transmitted power of the PTU. The received power processing unit 1084 acquires the value of received power from the PRU. The second determination unit 1086 determines the current operation state of the amplifier using the transmitted power value calculated through the transmitted power processing unit 1082 and the received power value acquired through the received power processing unit 1084. The adjustment unit 1088 adjusts the value of the resonant capacitor Cs and the output power of the amplifier according to the result of the determination of the first determination unit 1080 and the second determination unit 1086. The output power of the amplifier may be adjusted by adjusting the DC source voltage VDC applied to the amplifier.

When the switch is in the hard-switching operation state according to the result of the determination of the first determination unit 1080, and the transmitted power of the PTU is higher than a maximum allowable received power set to drive the load of the PRU and thus the PTU is in an excessive power transmission state according to the result of the determination of the second determination unit 1086, the adjustment unit 1088 according to the embodiment increases the value of the resonant capacitor Cs. At this point, when the increased value of the resonant capacitor Cs reaches the maximum value, the adjustment unit lowers the transmitted power of the PTU by reducing the DC source voltage VDC of the amplifier.

When the switch is in the hard-switching operation state according to the result of the determination of the first determination unit 1080, and the power is not in the excessive power transmission state according to the result of the determination of the second determination unit 1086, the adjustment unit 1088 according to the embodiment reduces the value of the resonant capacitor Cs.

When the switch is not in the hard-switching operation state according to the result of the determination of the first determination unit 1080, and the received power of the PRU is not lower than the minimum received power set to drive the load according to the result of the determination of the second determination unit 1086, the adjustment unit 1088 according to the embodiment determines whether the received power of the PRU is excessively higher than necessary. When the received power is excessively high, the adjustment unit reduces the DC source voltage VDC of the amplifier without changing the value of the resonant capacitor Cs to lower the transmitted power of the PTU.

When the switch is not in the hard-switching operation state according to the result of the determination of the first determination unit 1080, and the received power of the PRU is lower than the minimum received power set to drive the load according to the result of the determination of the second determination unit 1086, the adjustment unit 1088 according to the embodiment reduces the value of the resonant capacitor Cs. At this point, when the transmitted power of the PTU is still low although the reduced value of the resonant capacitor Cs has reached the minimum value, the adjustment unit increases the DC source voltage VDC of the amplifier to increase the transmitted power of the PTU.

Figure 11:
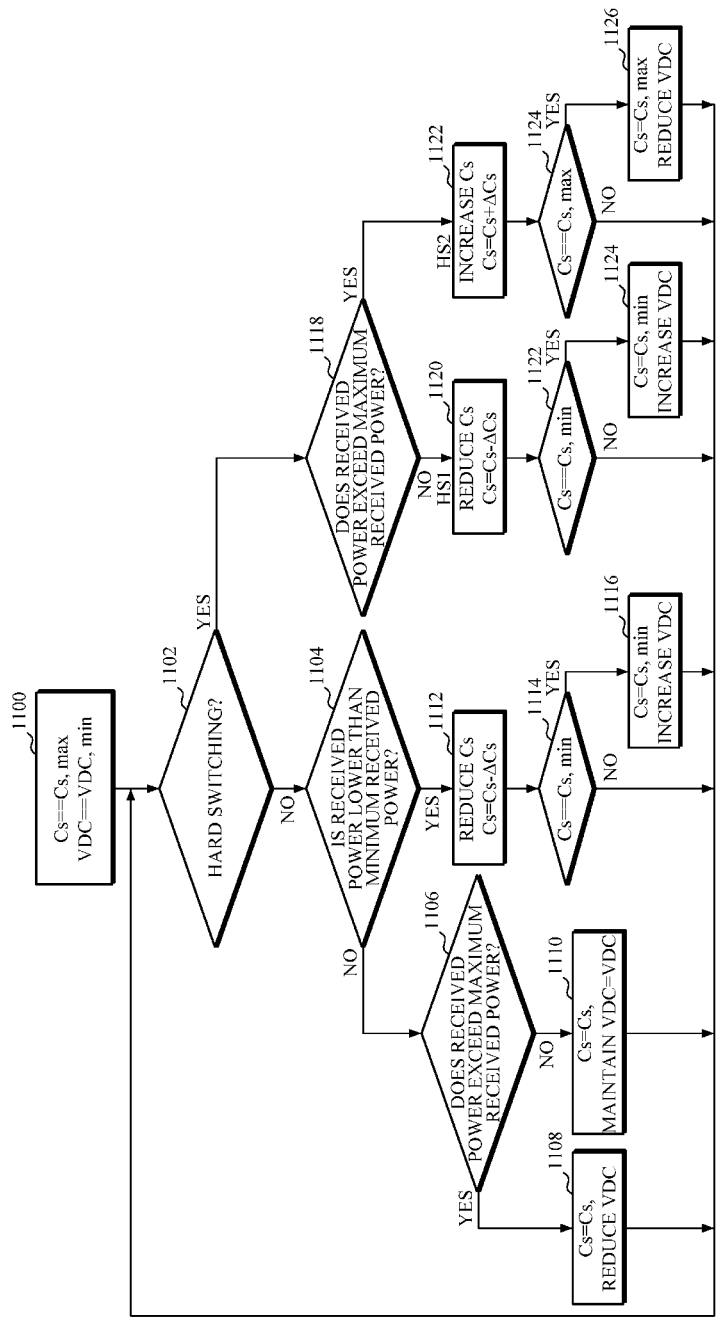
FIG. 11 is a flowchart illustrating an auto-tuning method for a PTU according to one embodiment of the present invention.

FIG. 11 is a flowchart illustrating an auto-tuning method for a PTU according to one embodiment of the present invention.

The auto-tuning process of the PTU of FIG. 11 may be performed by the controller 108 of FIG. 9. It is assumed that the value of the resonant capacitor Cs can vary up to the maximum value Cs, max. The value of the resonant capacitor Cs does not matter in the operation, but it is better to start the operation from the point where the resonance frequency is low considering the stability of the operation. Therefore, the resonant capacitor Cs is set to have the maximum value (Cs=Cs, max) at the start of the operation (1100). Since the amplifier is not in operation yet, the DC source voltage VDC of the amplifier is the minimum value VDC, min (VDC=VDC, min) (1100).

Then, when the amplifier operates, it is determined whether hard switching is performed (1102). When the operation is not in the hard-switching operation state, the operation of ZVS is performed, and therefore the operation of the amplifier is normal. When the operation of the amplifier is normal, it is determined whether the received power supplied to the PRU is lower than the minimum received power set to drive the load (1104). When the received power is not lower than the minimum received power, the resonant capacitor Cs and the DC source voltage VDC are both properly set, and therefore the values thereof are not changed (1110). It is determined whether the power received by the PRU is higher than the maximum allowable received power set to drive the load (1106). When the received power exceeds the maximum allowable received power, the DC source voltage VDC is reduced without changing the value of the resonant capacitor Cs (1108) to lower the transmitted power of the PTU.

In operation 1104 of determining whether sufficient power is being received by the PRU, when the received power supplied to the PRU is lower than the minimum received power set to drive the load, the value of the capacitor Cs is reduced (1112) to increase the resonance frequency. When the received power of the PRU is still low although the value of the capacitor Cs has decreased and reached the minimum value Cs, min (1114), the DC source voltage VDC is increased (1116).

In operation 1102 of determining whether hard switching is performed, when it is determined that hard switching is occurring, it is determined whether the received power of the PRU exceeds the maximum allowable received power set to drive the load (1118). When the transmitted power of the PTU exceeds the maximum allowable received power of the PRU, it is determined that the efficiency is greatly decreasing, and therefore the operation of HS2 is performed. Therefore, in this case, the value of the capacitor Cs is increased (1122). Then, it is determined whether the value of the capacitor Cs has reached the maximum value Cs, max (1124). When the value of the capacitor is the maximum value Cs, max, the DC source voltage VDC is reduced (1126) to lower the transmitted power of the PTU.

When the operation is in the hard-switching operation state, but the power supplied to the PRU does not exceed the maximum allowable received power, it may be determined that the current through the resonator is small and thus the operation is performed in the state of HS1. In this case, the value of the capacitor Cs is reduced to increase the resonance frequency (1120).

As in the conventional PTU auto-tuning method, the series resonant capacitor Cp is changed to stabilize the operation of the amplifier and supply desired power to the PRU. However, in the conventional method, the impedance of the resonator is measured and the phase is measured based on the measured information to tune the capacitor. That is, if possible, the resonance point is controlled to be constant under all impedance conditions. On the other hand, in the method proposed by the present invention, auto-tuning is attempted by detecting the operation state of the switch, particularly, the hard switching state. Therefore, not only the switch can be protected quickly but the need for a complicated and precise impedance detection circuit is eliminated. Therefore, auto-tuning can be performed in a very simple manner.

Figure 12:
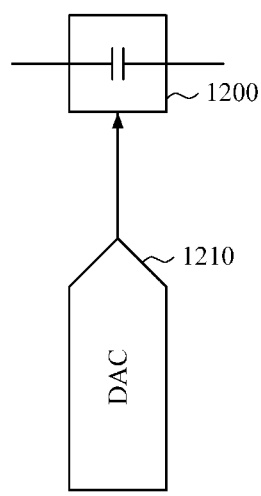
FIGS. 12 and 13 show implementation examples of a variable capacitor according to various embodiments of the present invention.
Figure 13:
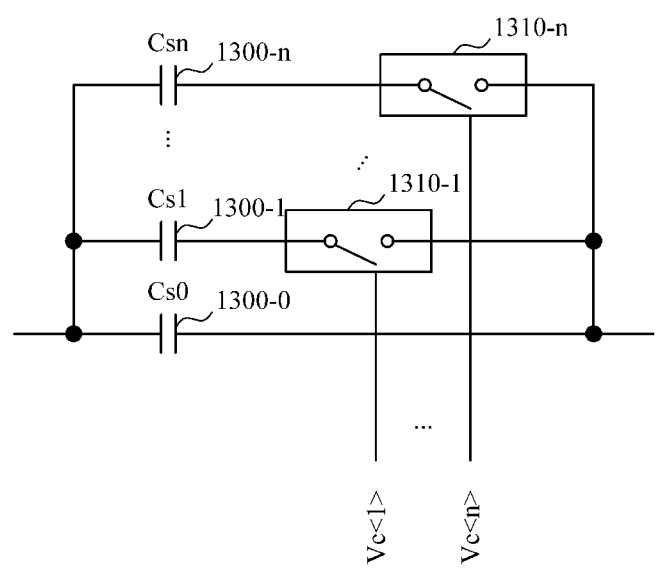

FIGS. 12 and 13 show implementation examples of a variable capacitor according to various embodiments of the present invention.

Referring to FIGS. 12 and 13, the capacitor adjusted through auto-tuning may be a variable capacitor. As the variable capacitor, an electrically tunable capacitor 1200 may be used as shown in FIG. 12. In this case, a digital-to-analog converter (DAC) 1210 may be needed to generate a variable signal. A signal for controlling the DAC 1210 is provided by the controller 108 of FIG. 9.

The capacitance value may be varied by a combination of capacitor switches 1310-1 to 1310-*n* and capacitors 1300-1 to 1300-*n* as shown in FIG. 13 without using the variable capacitor 1200 of FIG. 12. For example, the capacitor switches 1310-1 to 1310-*n* may be selectively turned on/off and the capacitance value may be varied through a capacitor connected to a capacitor switch that is turned on. To this end, the capacitor switches 1310-1 to 1310-*n* are selectively switched according to switch control signals Vc<1> to Vc<n> received from the controller 108.

The embodiments of the present invention have been described above. It will be understood by those skilled in the art that various changes in form and details can be made in the present invention without departing from the spirit and scope of the invention as defined by the appended claims. Therefore, the disclosed embodiments should be considered in an illustrative rather than a restrictive sense. The scope of the present invention is defined by the appended claims rather than by the foregoing description, and all differences within the scope of equivalents thereof should be construed as being included in the present invention.

The invention claimed is:

1. An auto-tuning device for a wireless power transmitting unit, comprising:
    a hard-switching detector configured to detect a hard-switching operation state of a switch in an amplifier constituting a wireless power transmitting unit; and
    a controller configured to automatically adjust a value of a resonant capacitor according to the detected hard-switching operation state.

2. The auto-tuning device of claim 1, wherein the hard-switching detector detects whether the switch is turned on based on a drive voltage signal of the switch, and detects whether the switch is in the hard-switching operation state based on a drain voltage of the switch when the switch is turned on.

3. The auto-tuning device of claim 1, wherein, when the switch is in an operation state in which the resonance frequency is increased by a load and thus hard switching is performed, the controller increases the value of the resonant capacitor to reduce an increment of the resonance frequency, and when the switch is in an operation state in which the resonance frequency is decreased by the load and thus hard switching is performed, the controller decreases the value of the resonant capacitor to increase a decrement of the resonance frequency.

4. The auto-tuning device of claim 1, wherein the controller determines a current operation state of the amplifier using an output power value of the amplifier and a received power value of a wireless power receiving unit in addition to the hard-switching operation state, and controls the value of the resonant capacitor according to a result of the determination.

5. The auto-tuning device of claim 1, wherein the controller controls the value of the resonant capacitor and an output power of the amplifier.

6. The auto-tuning device of claim 1, wherein the resonant capacitor is a variable capacitor whose capacitance is electrically adjusted, the auto-tuning device further comprising
a digital-to-analog converter (DAC) configured to generate a variable signal under control of the controller and apply the variable signal to the variable capacitor.

7. The auto-tuning device of claim 1, wherein the resonant capacitor comprises a plurality of capacitors connected to capacitor switches, capacitances of the plurality of capacitors being variable by switching of the respective switches, the auto-tuning device further comprising
a plurality of capacitor switches to be selectively switched according to a switch control signal received from the controller.

8. An auto-tuning device for a wireless power transmitting unit, comprising:
a hard-switching detector configured to detect a hard-switching operation state of a switch in an amplifier constituting a wireless power transmitting unit;
a first determination unit configured to receive a detection signal from the hard-switching detector and determine whether the switch is in the hard-switching operation state;
a transmitted power processing unit configured to acquire a value of a source voltage and a value of a source current of the amplifier and calculate a value of a transmitted power of the wireless power transmitting unit;
a received power processing unit configured to acquire a value of a received power from a wireless power receiving unit;
a second determination unit configured to determine a current operation state of the amplifier using the calculated value of the transmitted power and the acquired value of the received power; and
an adjustment unit configured to adjust a value of a resonant capacitor and an output power of the amplifier according to a result of the determination of the first determination unit and the second determination unit.

9. The auto-tuning device according to claim 8, wherein, when the switch is in the hard-switching operation state according to the result of the determination of the first determination unit, and the value of the transmitted power of the wireless power transmitting unit exceeds a maximum allowable received power set to drive a load of the wireless power receiving unit and thus the wireless power transmitting unit is in an excessive power transmission state according to the result of the determination of the second determination unit, the adjustment unit increases the value of the resonant capacitor, and reduces, when the increased value of the resonant capacitor reaches a maximum value, the source voltage of the amplifier to lower the transmitted power of the wireless power transmitting unit.

10. The auto-tuning device of claim 8, wherein, when the switch is in the hard-switching operation state according to the result of the determination of the first determination unit, and the wireless power transmitting unit is not in an excessive power transmission state according to the result of the determination of the second determination unit, the adjustment unit reduces the value of the resonant capacitor.

11. The auto-tuning device of claim 8, wherein, when the switch is not in the hard-switching operation state according to the result of the determination of the first determination unit, and the received power of the wireless power receiving unit is not lower than a minimum received power set to drive a load according to the result of the determination of the second determination unit, the adjustment unit determines whether the received power of the wireless power receiving unit is excessively higher than necessary, and when the received power is excessively high, the adjustment unit reduces the source voltage of the amplifier without changing the value of the resonant capacitor to lower the transmitted power of the wireless power transmitting unit.

12. The auto-tuning device of claim 8, wherein, when the switch is not in the hard-switching operation state according to the result of the determination of the first determination unit, and the received power of the wireless power receiving unit is lower than a minimum received power set to drive a load according to the result of the determination of the second determination unit, the adjustment unit reduces the value of the resonant capacitor and, when the transmitted power of the wireless power transmitting unit is still low although the reduced value of the resonant capacitor has reached the minimum value, the adjustment unit increases the source voltage of the amplifier to increase the transmitted power of the wireless power transmitting unit.

13. The auto-tuning device of claim 8, wherein the received power processing unit receives the value of the received power of the wireless power receiving unit from the wireless power receiving unit through Bluetooth communication.

* * * * *